(12) United States Patent
Hobohm

(10) Patent No.: US 9,555,487 B2
(45) Date of Patent: Jan. 31, 2017

(54) END MILL CUTTER

(75) Inventor: Uwe Hobohm, Wnedelstein (DE)

(73) Assignee: KENNAMETAL INC., Latrobe, PA (US)

( * ) Notice: Subject to any disclaimer, the term of this patent is extended or adjusted under 35 U.S.C. 154(b) by 272 days.

(21) Appl. No.: 12/989,931

(22) PCT Filed: May 19, 2009

(86) PCT No.: PCT/EP2009/003531
§ 371 (c)(1),
(2), (4) Date: Jan. 10, 2011

(87) PCT Pub. No.: WO2009/146792
PCT Pub. Date: Dec. 10, 2009

(65) Prior Publication Data
US 2011/0123280 A1    May 26, 2011

(30) Foreign Application Priority Data

May 30, 2008  (DE) ................. 10 2008 025 961

(51) Int. Cl.
*B23C 5/18* (2006.01)
*B23C 5/10* (2006.01)

(52) U.S. Cl.
CPC ....... *B23C 5/1081* (2013.01); *B23C 2210/086* (2013.01); *B23C 2210/282* (2013.01); *B23C 2210/486* (2013.01); *B23C 2210/56* (2013.01); *B23C 2220/40* (2013.01); *B23C 2222/28* (2013.01); *B23C 2240/08* (2013.01); *B23C 2250/16* (2013.01); *Y10T 407/1908* (2015.01); *Y10T 407/1948* (2015.01); *Y10T 409/303752* (2015.01)

(58) Field of Classification Search
USPC ........................... 407/34, 53, 54, 58, 59, 61
IPC ........................................................ B23C 5/18
See application file for complete search history.

(56) References Cited

U.S. PATENT DOCUMENTS

| 3,456,316 | A | | 7/1969 | Dawson | |
|---|---|---|---|---|---|
| 3,715,788 | A | * | 2/1973 | Ayer | B23C 5/2403 407/37 |
| 4,367,991 | A | * | 1/1983 | Grafe et al. | 408/224 |
| 4,497,600 | A | * | 2/1985 | Kishimoto | 407/53 |
| 4,560,308 | A | * | 12/1985 | Deller | 407/53 |
| 5,226,760 | A | * | 7/1993 | Nishimura | 407/54 |

(Continued)

FOREIGN PATENT DOCUMENTS

| DE | 1 042 873 B | 11/1958 |
|---|---|---|
| DE | 1177904 | 9/1964 |

(Continued)

OTHER PUBLICATIONS

JP05138421A English abstract translation.*

(Continued)

*Primary Examiner* — Sunil K Singh
*Assistant Examiner* — Alan Snyder
(74) *Attorney, Agent, or Firm* — Larry R. Meenan

(57) ABSTRACT

End mill cutter having a plurality of cutting edges distributed over the circumference of the mill cutter, having a flank which is adjacent to the respective cutting edge in the circumferential direction and a supporting surface which adjoins the flank on that side which faces away from the cutting edge in the circumferential direction.

17 Claims, 8 Drawing Sheets

(56) References Cited

U.S. PATENT DOCUMENTS

| | | | | |
|---|---|---|---|---|
| 5,486,072 | A * | 1/1996 | Green | 407/32 |
| 5,807,032 | A * | 9/1998 | Abe | 407/118 |
| 6,773,209 | B2 * | 8/2004 | Craig | 407/63 |
| 6,976,811 | B1 * | 12/2005 | DeRoche | B23C 5/109 |
| | | | | 407/56 |
| 7,306,408 | B2 * | 12/2007 | Wells et al. | 407/53 |
| 7,338,237 | B2 * | 3/2008 | Frejd | 408/230 |
| 7,588,396 | B2 * | 9/2009 | Flynn | 407/54 |
| 2002/0090273 | A1 * | 7/2002 | Serwa | 409/132 |
| 2002/0102140 | A1 * | 8/2002 | Thomas | 407/53 |
| 2006/0067797 | A1 * | 3/2006 | Calamia | 407/53 |
| 2006/0280567 | A1 * | 12/2006 | Craig | 407/113 |
| 2007/0160429 | A1 * | 7/2007 | Volokh | 407/53 |
| 2007/0237594 | A1 * | 10/2007 | Lang et al. | 408/230 |
| 2007/0286691 | A1 * | 12/2007 | Glimpel et al. | 407/54 |
| 2009/0232610 | A1 * | 9/2009 | Takagi et al. | 407/54 |
| 2010/0003089 | A1 * | 1/2010 | Horiike et al. | 407/40 |

FOREIGN PATENT DOCUMENTS

| | | | |
|---|---|---|---|
| DE | 36 23 175 A1 | | 1/1988 |
| EP | 0365218 A1 | | 4/1990 |
| JP | 56134112 A | * | 10/1981 |
| JP | S59-176713 A | | 10/1984 |
| JP | 59176713 U | | 11/1984 |
| JP | 62-141413 | | 9/1987 |
| JP | 63-116214 | | 7/1988 |
| JP | 05138421 A | * | 6/1993 |
| JP | H09136209 H0 | | 5/1997 |
| JP | H10-138031 A | | 5/1998 |
| JP | 0925863 A2 | * | 6/1999 ........... B23C 5/2221 |
| JP | H11179611 H1 | | 7/1999 |
| JP | H11-277320 A | | 10/1999 |
| JP | 2002018627 A | | 1/2002 |
| JP | 2004-82306 A | | 3/2004 |
| JP | 2004142055 | | 5/2004 |
| JP | 2005199393 | | 7/2005 |
| JP | 2008502490 A | | 1/2008 |
| JP | 2008068345 | | 3/2008 |
| JP | 5806931 B2 | | 11/2015 |
| WO | 94/21412 A1 | | 9/1994 |
| WO | 2005122690 A2 | | 12/2005 |
| WO | 2006041353 A1 | | 4/2006 |

OTHER PUBLICATIONS

JP56134112A English abstract translation.*
Tool and Manufacturing Engineers Handbook, 1983, Society of Manufacturing Engineers, Fourth Edition, vol. 1, pp. 10-32 to 10-33.*
European Patent Office, "International Preliminary Report on Patentability (Translation)", Apr. 1, 2011, 6 pp.
Canadian Intellectual Property Office, "Requisitions by the Examiner", Apr. 11, 2012, 2 pp.
Nov. 5, 2013—KH-2660DEJP1-OA.
Japanese Patent Office, Notice of Reasons for Rejection, with English language translation, for corresponding JP Appeal 2014-4158 (JP Appl. No. 2011-510868), Apr. 28, 2015, 10 pp.
Apr. 28, 2015 Office Action (3 months) 3 2011-521794.
Sep. 1, 2015 Notice of Allowance 2011-521794.
Sep. 8, 2015 Second Office Action KH-02660-JP-PCD.
Jan. 19, 2016 Third Office Action KH-02660-JP-PCD.
Notice of Allowance of JP 2014-041480.

* cited by examiner

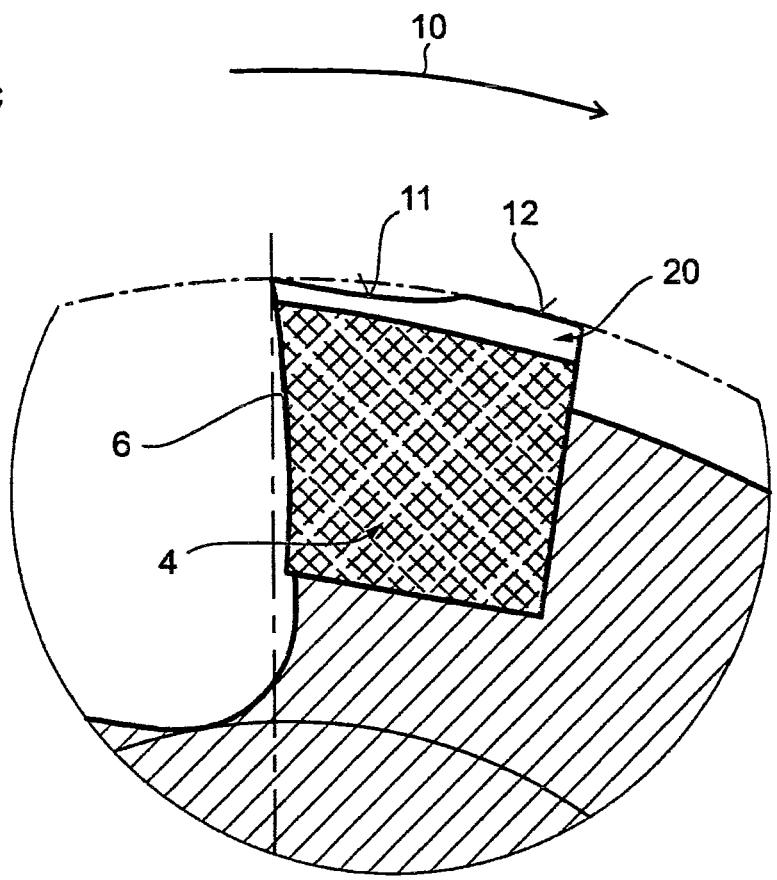

END MILL CUTTER

BACKGROUND OF THE INVENTION

Field of the Invention

The invention relates to a multi-edged end mill cutter. Such end mill cutters are normally used as conventional-milling cutters for the rough and finish machining of workpieces. For the machining, the workpieces are not always clamped in chucks of special machine tools. On the contrary, it is also normal practice for workpieces suspended during production from special transport and conveying equipment to be machined by means of such end mill cutters. For example, it is normal practice in the production of automobiles to suspend axle carriers or similar subassemblies from simple stirrups and to then machine them.

Description of the Related Art

As a result of a lack of stable clamping in a workpiece chuck, the workpiece is suspended only in a very unstable manner, such that the milling tool rotating in the opposite direction causes the workpiece suspended in an unstable manner to vibrate during the milling. This vibration of the workpiece immediately causes high wear of the cutting edges on the tool. Chipping of the cutting edges may even occur as a result of the irregular vibration of the workpieces. An unsatisfactory solution to the problem consists in the use of end mill cutters having cutting inserts. However, the use of these cutting inserts considerably increases the setting-up times for the tools.

Proceeding from these disadvantages, the object of the invention is to improve an end mill cutter with regard to its stability. This object is achieved in an inventive manner by the combination of features of device claim 1 and of method claim 14. The claims that refer back contain partly advantageous developments of the invention and partly developments of the invention that are inventive on their own.

SUMMARY OF THE INVENTION

The basic idea of the invention consists in the arrangement of a sliding surface in the region of each flank of the cutting edge of the end mill cutter. The individual cutting edges of the end mill cutter are distributed over the circumference of the cutter. The number of cutting edges depends in this case on the machining objective pursued. The workpiece is set in vibration as a result of the engagement of each cutting edge on the workpiece. The sliding surface arranged in the region of the cutting edge comes into contact with the workpiece briefly after the engagement of the cutting edge, is supported on the workpiece and thus dampens again the unwanted vibratory movement of the workpiece. The sliding surface is therefore effective as a supporting surface in the invention.

According to the invention, the region that is adjacent in the circumferential direction of the cutting edge is divided into a flank and the supporting surface adjoining the flank. The flank ensures a reliable cutting movement of the cutting edge and the requisite chip disposal. The flank is consequently defined on the one side by the cutting edge and on the other side by the supporting surface. The supporting surface acts and more or less completely dampens the vibration of the workpiece caused by the engagement of the cutting edge.

In an advantageous configuration, the supporting surface is polished. In a further configuration, the supporting surface is coated with PVD thin films. All of these measures serve to prevent material accumulations, in particular adhering material or friction welds. These measures ensure that the supporting surface, apart from exerting its supporting function, causes no undesirable secondary phenomena to appear on the workpiece.

In an advantageous configuration, the region of the cutter outside diameter in the region of the supporting surface is slightly smaller than in the region of the cutting edge of the cutter. This configuration promotes good concentric running of the end mill cutter and prevents tilting of the end mill cutter on the workpiece. This good concentric running behavior of the end mill cutter is further promoted by a cylindrically ground run-out of the supporting surface provided in a further configuration.

Furthermore, to stabilize the cutting edge and increase the service life of the cutting edge, provision is made for the cutting edge corner to be rounded. Furthermore, provision is made to assign a cutting edge bevel to the cutting edge. Both the edge rounding mentioned and the cutting edge bevel serve to protect the cutting edge. In particular in the case of workpieces which tend to build up oscillations, like the suspended workpieces in question here, such protection of the cutting edge is advantageous.

To stabilize the concentric running behavior of the tool and to avoid periodic vibrations on the workpiece, the cutting edges are arranged with an unequal pitch relative to one another over the circumference of the end mill cutter.

To improve the result of the cut and to achieve short chips, the cutting edges are offset from one another in the axial direction in such a way that they overlap one another.

The combination of cutting edge, flank and supporting surface, said combination being proposed in a configuration of the end mill cutter according to the invention, in a cutting edge module which is configured as a carbide strip and can be brazed onto the parent body of an end mill cutter has the advantage that the cutter parent body can be produced from a heat-resistant "hot-work steel". The cutter parent body can be optimized with regard to its material properties in the same way as the cutting edge module to be brazed in place. Suitable and preferred materials for the brazed-on cutting edge modules or cutting inserts are carbide, cermet, ceramic, cubic boron nitride (CBN) or polycrystalline diamond (PCD).

In a further advantageous configuration, the cutting edge modules are divided into a plurality of cutting edge segments. For this purpose, each cutting edge module has chip breaker grooves running transversely to the center longitudinal axis of the end mill cutter. The chip breaker grooves form the respective cutting edge segments between them. In an advantageous configuration, the chip breaker grooves are arranged in such a way that they are offset from one another in the axial direction like the cutting edges in order to ensure in turn good chip breaking and thus the generation of short chips.

In an alternative configuration, it is likewise possible to arrange the elements described, namely cutting edge, flank and supporting surface, on a cutting insert, in particular an indexable cutting insert, in order to likewise utilize for the invention the advantages associated with the use of such cutting inserts.

In a further configuration, it is possible to produce a solid end mill cutter, for example from carbide or from high speed steel (HSS) or a comparable material, which has the inventive configuration of the cutting edge with adjoining flank and in turn an adjoining supporting surface. A cutter produced from solid metal and having the features according to the invention is considered to be especially advantageous.

The cutter according to the invention advantageously permits the use of a climb-milling method. The conventional-milling method is normally used in the case of workpieces clamped in an unstable manner. Here, the workpiece is pushed away by the milling tool during the machining. As a result of the movement in the opposite direction, the workpiece tends to build up oscillations and to chatter. According to the prior art, however, it does not appear to be possible to machine workpieces clamped in an unstable manner using a climb-milling method, since backlash-free machining in the region of the point of action is necessary for this purpose, because otherwise there is the risk of tool fracture.

When the end mill cutter according to the invention is used for a climb-milling method, first of all the fact that the climb-milling cutter tends to pull the workpiece to be machined up to the cutter, as it were, is utilized. Once the cutting edge of the cutter pulls the workpiece up to the end mill cutter during the cutting, the supporting surface comes into engagement with the workpiece and thus supports the end mill cutter relative to the workpiece, such that a build-up of oscillations of the workpiece is effectively prevented. The combination of the pulling movement exerted on the workpiece by the cutting edge of the cutter on the one hand and the supporting effect of the supporting surface on the other hand brings about the backlash-free machining, required for the climb milling, at the point of action.

The end mill cutter, for the machining, advances laterally up to the workpiece surface to be machined and is guided along this surface in a parallel manner or in the same plane. During the machining, the workpiece surface to be machined is pulled up, as it were, to the end mill cutter as a result of the synchronous rotary movement of the end mill cutter for the axial movement of the workpiece. The cutting conditions for the individual cutting edges of the cutter are promoted by the workpiece being pulled up to the tool in this way. The forces acting laterally as a result of the workpiece being pulled up on the end mill cutter and the vibrations caused by this are compensated for by the supporting surface according to the invention. By means of the tools according to the invention, it is possible to increase the tool service life by a factor of 3 to 4.

BRIEF DESCRIPTION OF THE DRAWINGS

The invention is explained in more detail with reference to an exemplary embodiment. In the drawing.

DETAILED DESCRIPTION OF THE INVENTION

Figure 1:
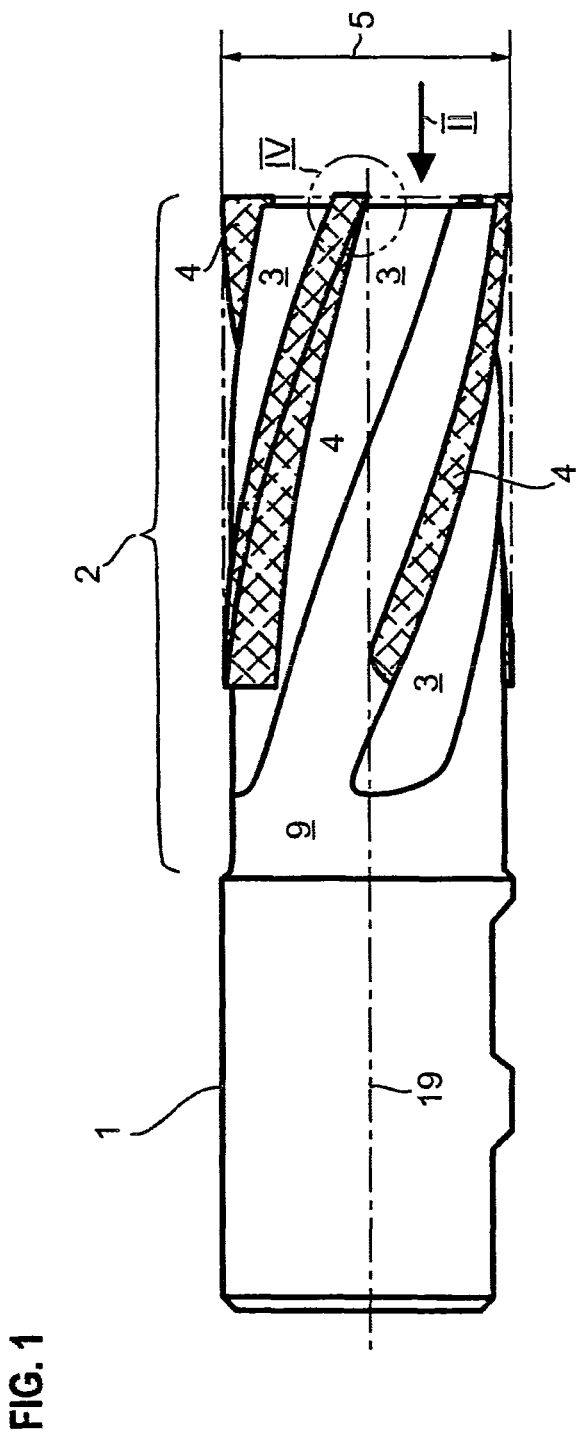
FIG. 1 shows a side view of the end mill cutter according to the invention with cutting edge modules.
Figure 2:
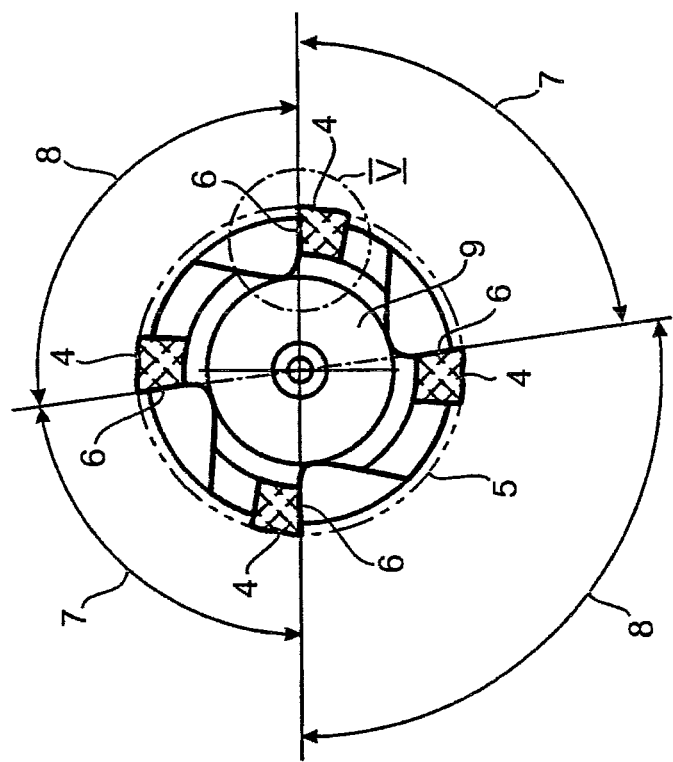
FIG. 2 shows the front view of the end mill cutter shown in FIG. 1 according to arrow II in FIG. 1.

The end mill cutter shown in side view in FIG. 1 consists of a clamping shank 1 for clamping in a tool chuck and a cutter region 2. The helical flutes 3 and the brazed-on cutting edge modules 4 can be seen in the cutter region 2. The cutter outside diameter 5 in the region of the cutting edge 6 can also be seen. It can be seen from the plan view of FIG. 2 that the cutter shown in the exemplary embodiment is a four-edged end mill cutter having four cutting edge modules 4. The pitch of the cutting edge modules and thus of the cutting edges 6 relative to one another is unequal. A small pitch angle 7 and a large pitch angle 8 alternate with one another in each case. In the exemplary embodiment, the small pitch angle 7 is 83° in each case, whereas the large pitch angle 8 is 97° in each case.

The cutting edge modules 4, which are brazed-on carbide strips in the exemplary embodiment, are brazed onto a parent body 9 made of hot-work steel. The flank 11 adjoins the cutting edge 6 in the circumferential direction 10. The supporting surface 12 adjoins the flank 11 in the circumferential direction 10.

Figure 3A:
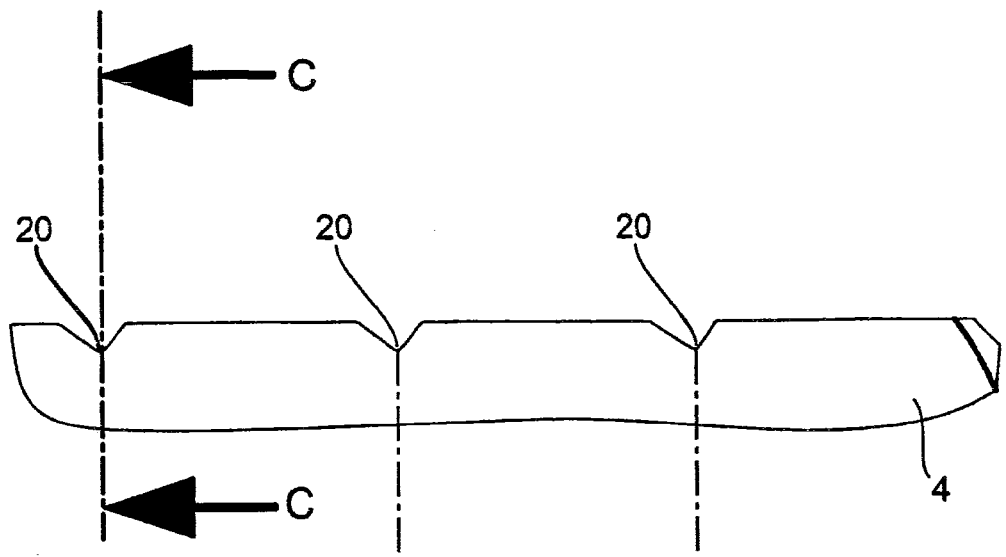
FIG. 3a shows a detail drawing of the cutting region of the cutting edge modules with integrally formed chip breaker grooves of a first cutting edge.
Figure 3B:
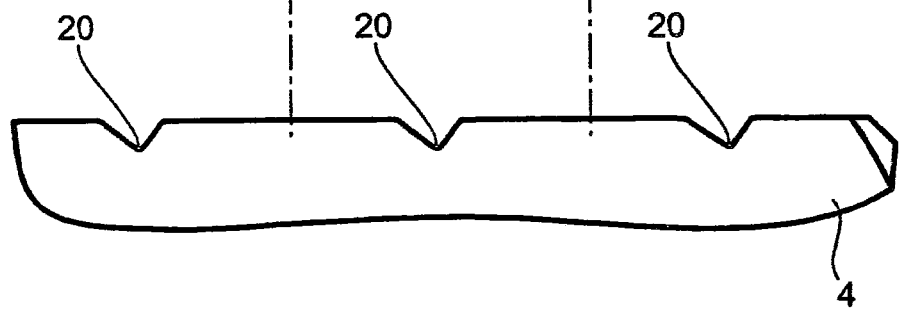
FIG. 3b shows the configuration and position of the cutting edge module of the next cutting edge on the end mill cutter, said cutting edge being offset from the first cutting edge according to FIG. 3a, FIG. 3c shows the section c-c in FIG. 3a, FIG. 4 shows the detail IV in FIG. 1
Figure 4:
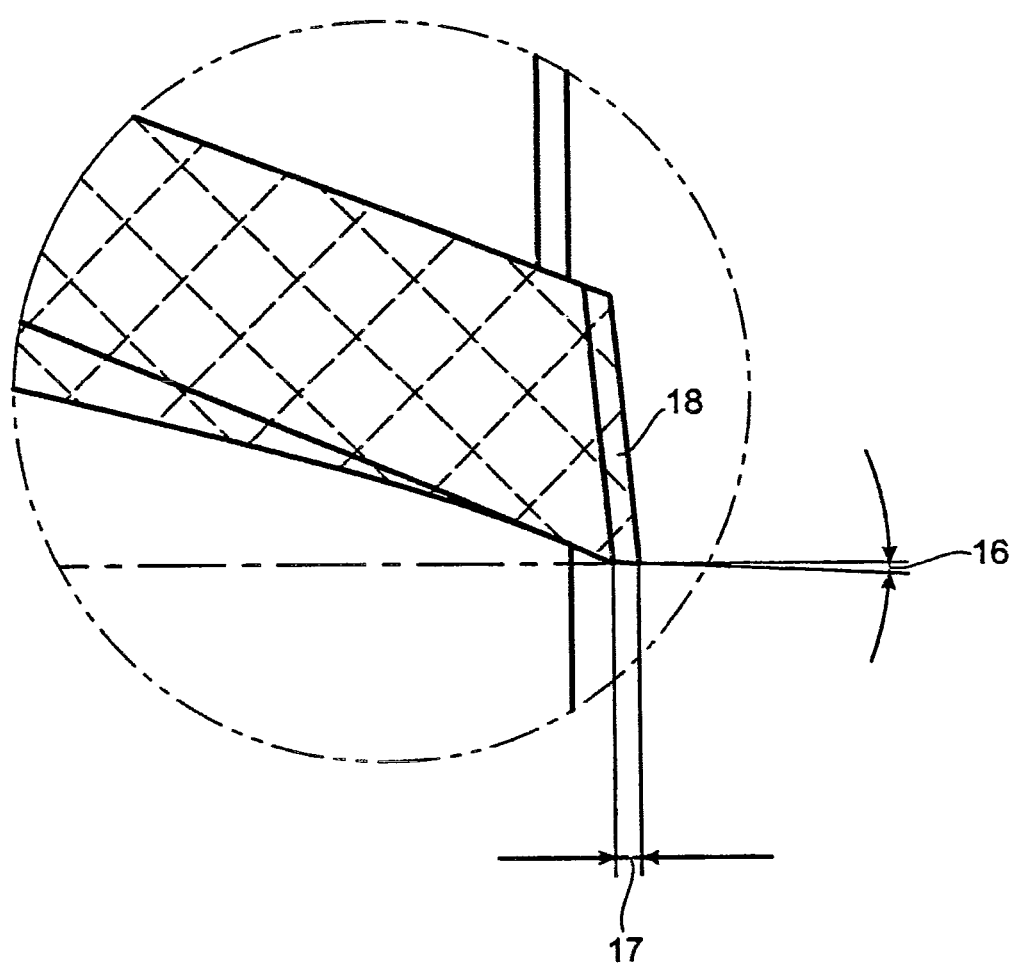
Figure 5:
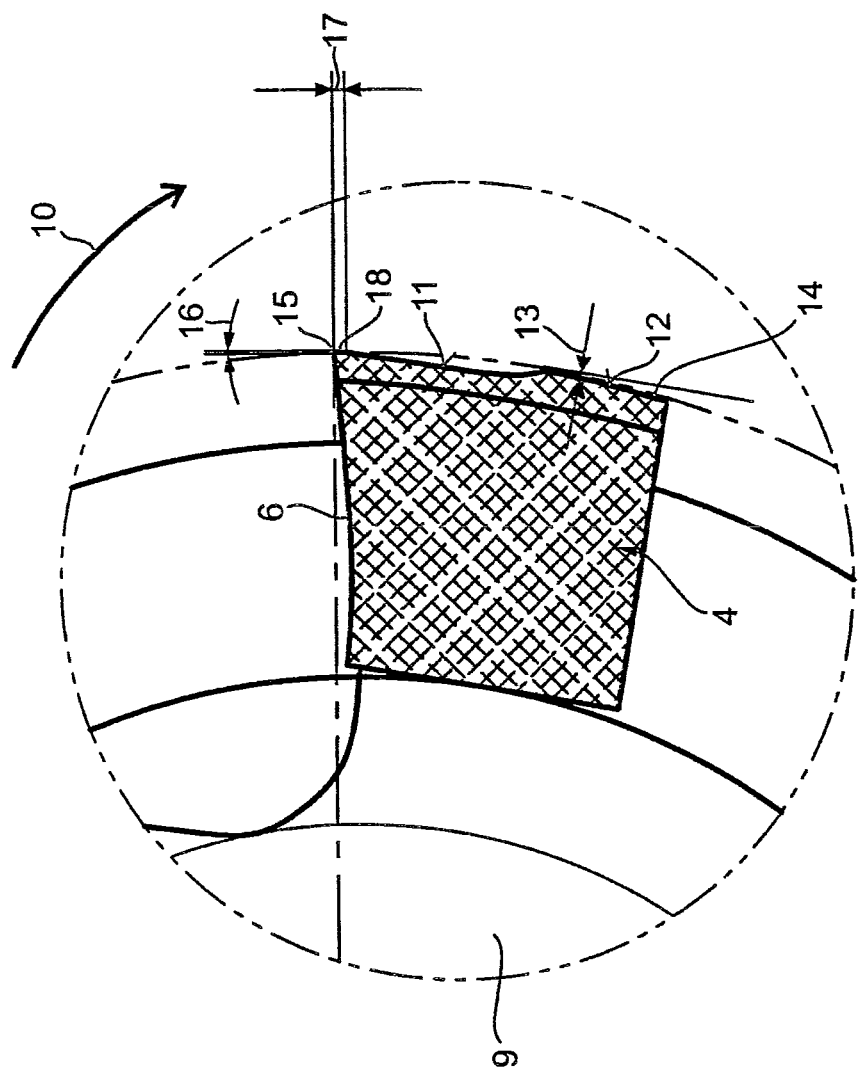
FIG. 5 shows the detail V in FIG. 2.

FIG. 3a shows a detail of a cutting edge module 4. Three chip breaker grooves 20 arranged at equal distances next to one another are integrally formed in this cutting edge module 4. These chip breaker grooves 20 run transversely to the center longitudinal axis 19 of the end mill cutter. FIG. 3b, arranged below FIG. 3a, shows the cutting edge module 4 of the corresponding adjacent cutting edge. Here, the auxiliary lines 21 show that the chip breaker grooves 20 of the adjacent cutting edge modules 4 are, as it were, "staggered", that is to say they are arranged offset from one another in the center longitudinal direction 19 of the end mill cutter. The unequal pitch as a result of the alternating small pitch angle 7 and large pitch angle 8 means that the chip breaker grooves 20 offset from one another produce chips of short breaking length.

The cutter outside diameter 5 is smaller in the region of the supporting surface 12 by the diameter difference than in the region of the cutting edge 6. The diameter difference 13 in the exemplary embodiment is 0.04 mm. The cutter outside diameter 5 of the end mill cutter is therefore 0.04 mm below the nominal size in the region of the supporting surface 12. Finally, the supporting surface end 14 of the supporting surface 12 has a cylindrically ground run-out for forming a clearance angle at the supporting surface end 14.

In the region of its cutting edge corner 15, the cutting edge 6 has edge rounding. In the exemplary embodiment, this edge rounding has an edge rounding radius 16 of 0.01 mm to 0.02 mm. Furthermore, the cutting edge 6 has a cutting edge bevel 18 having a cutting edge bevel width 17 of 0.15 mm. Furthermore, the end mill cutter shown in the exemplary embodiment has a thin-film coating. This coating is within the range of 0.5 to 0.8 μm. The coating significantly increases the wear resistance of the end mill cutter.

Figure 6:
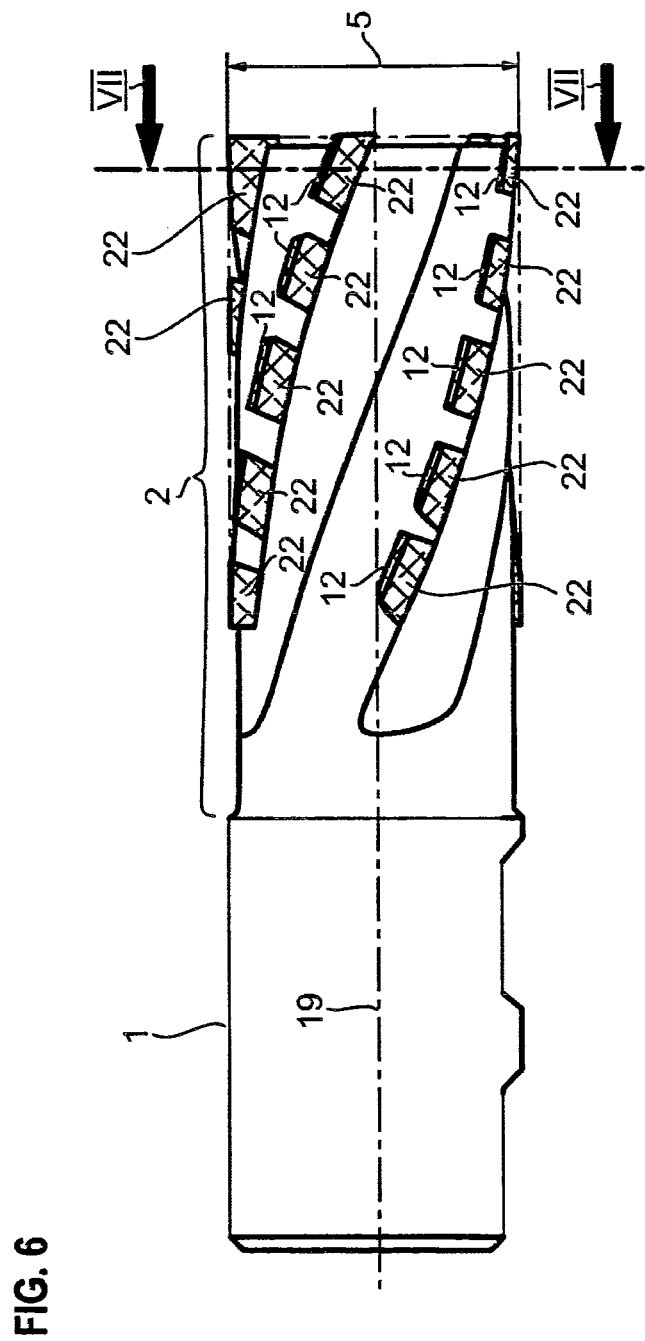
FIG. 6 shows a side view of an end mill cutter according to the invention with carbide indexable inserts screwed into insert seats.
Figure 7:
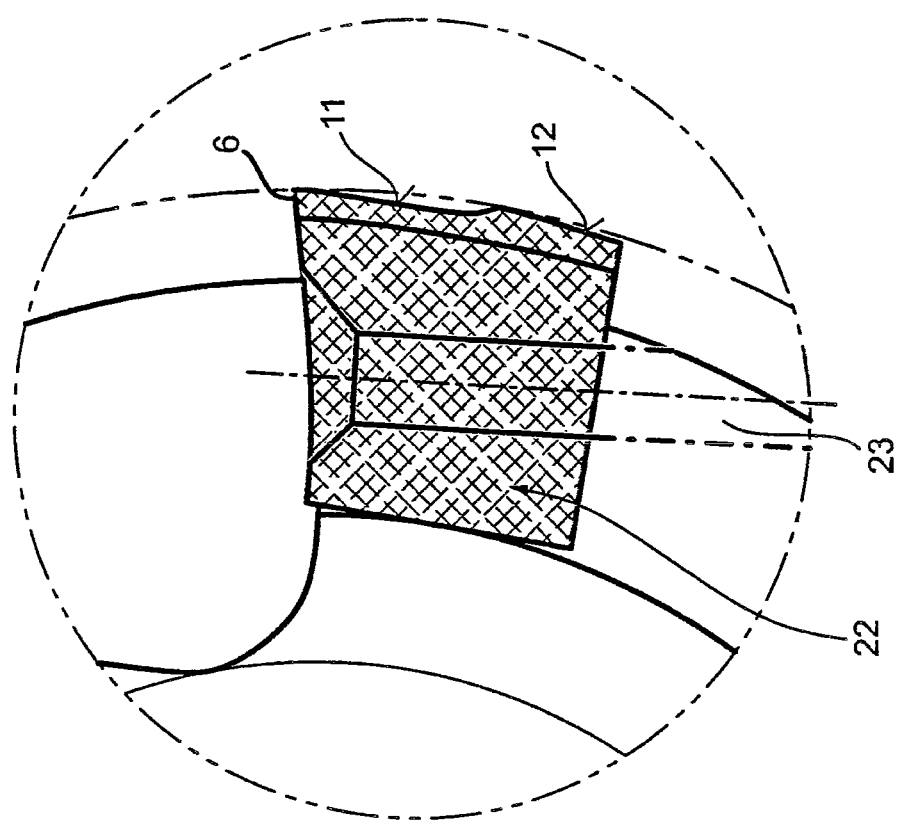
FIG. 7 shows the section VIII-VIII in FIG. 6.

The second exemplary embodiment of the inventive end mill cutter according to FIG. 6 and FIG. 7 again has a clamping shank 1 and a cutter region 2 adjacent to the clamping shank 1 in the direction of the center longitudinal axis 19 of the end mill cutter. In this embodiment, indexable inserts 22 are fixed as cutting bodies in corresponding insert seats on the end mill cutter. The indexable carbide inserts 22 are held in their insert seats by fastening screws 23. The fastening screws 23 are simply screwed into the insert seats through the indexable inserts 22. Each of the indexable inserts again has a cutting edge 6, a flank adjoining the cutting edge 6 and a supporting surface 12 again adjoining the flank 11. In the exemplary embodiment, the supporting surface 12 is coated with DCHP. The number of indexable inserts 22 used depends on the diameter of the cutter. The cutter outside diameter 5 can be designed to be variable by using the indexable inserts 22.

The end mill cutter functions as follows: first of all one of the cutting edges 6 comes into engagement with the workpiece. A chip (not shown in the drawings) is cut from the workpiece and slides off over the rake face 11 into the adjacent flute 3. The workpiece is pulled up during climb milling and is supported on the supporting surface 12, and so the individual supporting surfaces 12 support the workpiece like guide strips in order thus to prevent the workpiece from vibrating.

The invention claimed is:

1. An end mill cutter comprising:
   a parent cutter body having a cutter region of generally cylindrical shape having a cylindrical outer surface which defines an outer diameter, the cutter region having a plurality of flutes formed therein, each flute extending axially a length along the outer diameter, the cutter region comprising:
   a plurality of cutting edges distributed over the circumference of the cutter region, each cutting edge extending substantially along the length of a respective flute, the cutting edges defining a cutter outside diameter greater than the outer diameter of the cutter region;
   a plurality of flanks, each flank adjoining a respective cutting edge in the circumferential direction and extending substantially along the respective cutting edge, a portion of each flank being disposed within the cutter outside diameter defined by the respective cutting edge; and
   a plurality of supporting surfaces, each supporting surface adjoining a respective flank on that side which faces away from the cutting edge in the circumferential direction and extending substantially along the respective flank to define the respective flank in conjunction with the cutting edge, each supporting surface being disposed closer to the cutter outside diameter than the portion of the respective flank such that the supporting surfaces define an outside diameter less than the cutter outside diameter and greater than the outer diameter of the cutter region,
   wherein the cutting edges, the flanks adjoining said cutting edges, and the supporting surfaces are in each case an integral part of a carbide strip provided in a notched portion provided in the parent cutter body adjacent one of the plurality of flutes and circumferentially separated from another one of the number of flutes by a portion of the cylindrical outer surface of the cutter body, and
   wherein one or more carbide strips are brazed like cutting edge modules onto cutting edge regions on the parent body of the end mill cutter.

2. The end mill cutter as claimed in claim 1, further comprising a coating on the supporting surface.

3. The end mill cutter as claimed in claim 1, further comprising a cutter outside diameter in the region of the supporting surface that is reduced relative to the cutter outside diameter in the region of the cutting edge.

4. The end mill cutter as claimed in claim 3, further comprising a cylindrically ground run-out of the supporting surface, on that side of the supporting surface which faces away from the flank, for forming an adjoining clearance.

5. The end mill cutter as claimed in claim 1, comprising a rounded cutting edge corner.

6. The end mill cutter as claimed in claim 1, comprising a positive cutting edge stabilized by a cutting edge bevel.

7. The end mill cutter as claimed in claim 1, comprising an unequal pitch of the cutting edges relative to one another.

8. The end mill cutter as claimed in claim 1, comprising an offset of the cutting edges in the axial direction in such a way that the individual cutting edges overlap one another.

9. The end mill cutter as claimed in claim 1, further comprising chip breaker grooves which run transversely in the direction of the center longitudinal axis of the end mill cutter and divide the respective cutting edge module into cutting edge segments.

10. The end mill cutter as claimed in claim 1, wherein the cutter is a climb-milling cutter.

11. The end mill cutter as claimed in claim 1, comprising a solid carbide as material.

12. A method for machining a workpiece using an endmill as recited in claim 1, the method comprising machining the workpiece while both of the endmill and the workpiece are in motion.

13. The end mill cutter as claimed in claim 2 wherein the coating comprises a PVD thin film.

14. The end mill cutter as claimed in claim 1, wherein the supporting surfaces are polished.

15. The end mill cutter as claimed in claim 1, wherein each supporting surface defines a cutter outside diameter slightly smaller than the cutter outside diameter defined by the associated cutting edge.

16. The end mill cutter of claim 1, wherein the parent cutter body is formed of steel.

17. The end mill cutter of claim 1, wherein the plurality of flanks extends in a concave manner from the cutting edges to the supporting surfaces.

* * * * *